(12) United States Patent
Sato et al.

(10) Patent No.: US 6,977,182 B2
(45) Date of Patent: Dec. 20, 2005

(54) SEMICONDUCTOR NANOPARTICLES, METHOD FOR PRODUCING THE SAME, AND FLUORESCENCE REAGENT COMPRISING SEMICONDUCTOR NANOPARTICLES

(75) Inventors: Keiichi Sato, Tokyo (JP); Susumu Kuwabata, Osaka (JP)

(73) Assignee: Hitachi Software Engineering Co., LTD, Kanagawa (JP)

( * ) Notice: Subject to any disclaimer, the term of this patent is extended or adjusted under 35 U.S.C. 154(b) by 0 days.

(21) Appl. No.: 10/622,651

(22) Filed: Jul. 21, 2003

(65) Prior Publication Data

US 2004/0072427 A1    Apr. 15, 2004

(30) Foreign Application Priority Data

Jul. 23, 2002    (JP)    .............................. 2002-213599

(51) Int. Cl.[7] .............................................. H01L 21/00
(52) U.S. Cl. ................. 438/5; 252/301.4 R; 435/566.1
(58) Field of Search ........................ 438/5; 423/566.1; 252/301.4 R

(56) References Cited

U.S. PATENT DOCUMENTS

| | | | | |
|---|---|---|---|---|
| 5,906,670 | A * | 5/1999 | Dobson et al. ................ | 75/370 |
| 6,319,426 | B1 | 11/2001 | Bawendi et al. | |
| 6,649,138 | B2 * | 11/2003 | Adams et al. ............... | 423/403 |
| 6,869,545 | B2 * | 3/2005 | Peng et al. ............ | 252/301.6 S |
| 6,911,082 | B2 * | 6/2005 | Sato et al. ..................... | 117/68 |
| 2004/0007169 | A1 * | 1/2004 | Ohtsu et al. ................... | 117/84 |
| 2004/0031519 | A1 * | 2/2004 | Andriessen ................. | 136/252 |
| 2005/0145853 | A1 * | 7/2005 | Sato et al. ..................... | 257/79 |

FOREIGN PATENT DOCUMENTS

| | | |
|---|---|---|
| WO | WO 01/42489 A1 | 12/2000 |
| WO | WO 01/61045 A1 | 2/2001 |

OTHER PUBLICATIONS

Spanhel et al., "Photochemistry of Colloidal Semiconductors, 20, Surface Modification and Stability of Strong Luminescing CdS Particles", Journal of American Chemical Society, vol. 109, pp. 5649-5655, 1987.*

Yongchi Tian et al., "Coupled Composite CdS-CdSe and Core-Shell Types of (CdS)CdSe and (CdSe)CdS Nanoparticles", J. Phys. Chem. 1996, vol. 100, No. 21, 1996 American Chemical Society, pp. 8927-8939.

(Continued)

Primary Examiner—W. David Coleman
(74) Attorney, Agent, or Firm—Reed Smith LLP; Stanley P. Fisher, Esq.; Juan Carlos A. Marquez, Esq.

(57) ABSTRACT

This invention provides semiconductor nanoparticles having fluorescence properties and comprising a modifying group represented by the following general formula bound to their surfaces, a method for producing the same, and a fluorescence reagent comprising semiconductor nanoparticles:

—OY wherein Y is selected from a hydrogen atom, a metal atom, a semimetal atom, an organic group, or an organic group that is intermediated by a metal atom or a semimetal atom. In this method, the surfaces of the semiconductor nanoparticles were modified with a hydroxyl group or the like for stabilization. This realizes the production of semiconductor nanoparticles having fluorescence properties that significantly emit only the band gap fluorescence, the production of which at the industrial level was previously very difficult due to the necessity of many processes and from the viewpoint of technology and safety.

14 Claims, 2 Drawing Sheets

OTHER PUBLICATIONS

Hyeong-Chan Youn et al., "Dihexadecyl Phosphate, Vesicle-Stabilized and in Situ Generated Mixed CdS and ZnS Semiconductor Particles, Preparation and Utilization for Photosensitized Charge Separation and Hydrogen Generation", J. Phys. Chem. 1988, vol. 92, No. 22, 1988 American Chemical Society, pp. 6320-6327.

A. R. Kortan et al., "Nucleation and Growth of CdSc on ZnS Quantum Crystallite Seeds, and Vice Versa, in Inverse Micelle Media", J. Phys. Chem. 1990, vol. 112, No. 4, 1990 American Chemical Society, pp. 1327-1332.

B. O. Dabbousi et al., (CdSe) ZnS Core-Shell Quantum Dots: Synthesis and Characterization of a Size Series of Highly Luminescent Nanocrystallites, J. Phys. Chem. 1997, vol. 101, No. 46, 1997 American Chemical Society, pp. 9463-9475.

Lubomir Spanhel et al., "Photochemistry of Colloidal Semiconductors, 20. Surface Modification and Stability of Strong Luminescing CdS Particles" J. Phys. Chem. 1987, vol. 109, No. 19, 1987 American Chemical Society, pp. 5649-5655.

A.P. Alivisatos, "Perspectives on the Physical Chemistry of Semiconductor Nanocrystals", J. Phys. Chem. 1996, vol. 100, No. 31, 1996 American Chemical Society, pp. 13226-13239.

Hedi Mattoussi et al., "Self-Assembly of CdSe-ZnS Quantum Dot Bioconjugates Using an Engineered Recombinant Protein", J. Phys. Chem. 2000, vol. 122, No. 49, 2000 American Chemical Society, pp. 12142-12150.

Kerry P. McNamara and Zeev Rosenzweig, "Dye-Encapsulating Liposomes as Fluorescence-Based Oxygen Nanosensors", Anal. Chem., vol. 70, No. 22, Nov. 15, 1998, p. 4853-4859.

Dubertret et al., "In Vivo Imaging of Quantum Dots Encapsulated in Phospholipid Micelles", SCIENCE, vol. 298, Nov. 29, 2002, pp. 1759-1762.

* cited by examiner

SEMICONDUCTOR NANOPARTICLES, METHOD FOR PRODUCING THE SAME, AND FLUORESCENCE REAGENT COMPRISING SEMICONDUCTOR NANOPARTICLES

TECHNICAL FIELD

The present invention relates to novel semiconductor nanoparticles having sizes in the nanometer order, a method for producing the same, and a fluorescence reagent comprising the aforementioned semiconductor nanoparticles.

BACKGROUND ART

Semiconductor nanoparticles whose particle sizes are 10 nm or less are located in the transition region between bulk semiconductor crystals and molecules. Their physicochemical properties are therefore different from both bulk semiconductor crystals and molecules. In this region, due to the quantum-size effect, the energy gap of semiconductor nanoparticles increases as their particle sizes decrease. In addition, the degeneration of the energy band that is observed in bulk semiconductors is removed and the orbits are dispersed. As a result, the lower-end of the conduction band is shifted to the negative side and the upper-end of the valence band is shifted to the positive side.

Semiconductor nanoparticles of CdS can be easily prepared by dissolving equimolar amounts of precursors of Cd and S. This is also true for the manufacturing of, for example, CdSe, ZnS, ZnSe, HgS, HgSe, PbS, or PbSe.

Semiconductor nanoparticles have drawn attention since they emit strong fluorescences whose full widths at half maximum are narrow. Thus, various fluorescent colors can be created, and their future applications can be nearly infinite. However, the semiconductor nanoparticles obtained only by mixing the precursors with each other as described above have a wide distribution of particle sizes and therefore cannot provide the full advantage of the properties of semiconductor nanoparticles. Attempts have been made to attain a monodisperse distribution by using chemical techniques to precisely separate and extract only the semiconductor nanoparticles of a specific particle size from semiconductor nanoparticles having a wide distribution of particle sizes immediately after preparation. The attempts to attain a monodispersed distribution of particle sizes that have been reported so far include: separation by electrophoresis that utilizes variation in the surface charge of nanoparticles depending on their particle sizes; exclusion chromatography that utilizes differences in retention time due to different particle sizes; and size-selective precipitation that utilizes differences in dispersibility in an organic solvent due to differences in particle sizes.

A method was described above wherein the nanoparticles, which were prepared by mixing the precursors with each other, were separated depending on their particle sizes. Also reported is size-selective photoetching that attains a monodispersed distribution of particle sizes by utilizing the oxidative dissolution of a metal chalcogenide semiconductor in the presence of dissolved oxygen when irradiated with light.

There is also a method wherein a monodispersed distribution of particle sizes is attained through regulation at the phase of mixing the precursors with each other. A representative example thereof is the reversed micelle method. In the reversed micelle method, amphiphilic molecules such as diisooctyl sodium sulfosuccinate are mixed with water in an organic solvent such as heptane to form a reversed micelle therein, and precursors are allowed to react with each other only in an aqueous phase in the reversed micelle. The size of the reversed micelle is determined according to the quantitative ratio of the amphiphilic molecules to water, and its size can be relatively homogenously regulated. The sizes of prepared semiconductor nanoparticles depend on the size of the reversed micelle. Thus, semiconductor nanoparticles with relatively homogenous particle sizes can be prepared.

The thus prepared semiconductor nanoparticles exhibit a relatively narrow distribution of particle sizes. However, the fluorescence properties of the thus prepared semiconductor nanoparticles show smooth fluorescence emission spectra without any significant peaks. Further, the fluorescence emission spectra exhibit a peak at a wavelength that differs from the theoretical value of the fluorescence, which should be emitted by the semiconductor nanoparticles. Specifically, in addition to the band gap fluorescence emitted inside the semiconductor nanoparticles, the semiconductor nanoparticles emit completely different fluorescences, which are supposed to be emitted at the energy level in the forbidden band in the semiconductor nanoparticles. The energy level that emits this fluorescence is considered to exist mainly at the surface site of the semiconductor nanoparticles. Under normal circumstances, changes in fluorescence properties due to the particle size regulation of the semiconductor nanoparticles appear in the band gap fluorescence. This inhibits the properties of semiconductor nanoparticles having a narrow distribution of particle sizes, and thus, it has been a problem that should be solved. As a representative solution for this problem, a method has been attempted wherein a semiconductor material, which is a nucleus, is coated with a semiconductor material, inorganic material, or organic material having a band gap wider than that of the aforementioned semiconductor material to attain a multi-layer structure, and fluorescences thereof are inhibited. Examples of particularly representative methods of coating the semiconductor nanoparticles with inorganic materials include: coating of CdSe nanoparticles with CdS (J. Phys. Chem. 100: 8927 (1996)); coating of CdS nanoparticles with ZnS (J. Phys. Chem. 92: 6320 (1988)); and coating of CdSe nanoparticles with ZnS (J. Am. Chem. Soc. 112: 1327 (1990)). Regarding the CdSe nanoparticles coated with ZnS (J. Am. Chem. Soc. 112: 1327 (1990)), with the utilization of the Ostwald ripening, a production method that is carried out in the coordinated solvent is adopted, thereby successfully obtaining semiconductor nanoparticles having sufficient fluorescence properties (J. Phys. Chem. B. 101: 9463 (1997)). The aforementioned multi-layered semiconductor nanoparticles inhibit the defective site on the surface of the semiconductor nanoparticles and attain the original fluorescence properties of the semiconductor nanoparticles by coating them with a material having a band gap larger than that of the semiconductor nanoparticles and having no band gap in the forbidden band of the semiconductor nanoparticles.

Meanwhile, improvement in fluorescence properties of semiconductor nanoparticles in an alkaline aqueous solution has been reported as a physical property of the semiconductor nanoparticles in an aqueous solution (J. Am. Chem. Soc. 109: 5655 (1987)). Various experiments and reports have been made based on this report. However, none of them has arrived at an elucidation of the mechanism involved (e.g., J. Phys. Chem. 100: 13226 (1996) and J. Am. Chem. Soc. 122: 12142 (2000)). All the semiconductor nanoparticles in the alkaline solution were poor in reproducibility, and conditions for reproduction have not yet been identified. Further, none of these experiments or reports has succeeded in isolating a final substance.

The thus obtained semiconductor nanoparticles can inhibit the defective site to some extent, and have the original properties of the semiconductor nanoparticles to a certain extent. However, an advanced technology is necessary in order to prepare such semiconductor nanoparticles. In order to prepare semiconductor nanoparticles of higher quality, various facilities are required. In addition, from the viewpoints of a cost of reagents, safety of reaction at high temperature, and other factors, there have been serious drawbacks in terms of industrial mass-production.

Compared to currently used reagents such as organic pigments, however, semiconductor nanoparticles are more durable and fade less readily. Further, variation in particle sizes enables the development of various reagents, which exhibit spectra whose full widths at half maximum are narrow, from the same ingredient. This enables the application thereof not only to the optical devices and the like but also to, for example, the detection of biopolymers and the bioimaging. This indicates that the applications thereof are nearly infinite. Accordingly, semiconductor nanoparticles have recently drawn attention, and finding solutions to these drawbacks has been a recent object of researchers.

SUMMARY OF THE INVENTION

The present inventors have conducted concentrated studies, and as a result, they found that the above object could be attained with the application of a special treatment to the surfaces of the semiconductor nanoparticles. This has led to the completion of the present invention.

First of all, the semiconductor nanoparticles of the present invention have fluorescence properties and comprise a modifying group represented by the following general formula bound to their surfaces:

—OY wherein Y is selected from a hydrogen atom, a metal atom, a semimetal atom, an organic group, or an organic group that is intermediated by a metal atom or a semimetal atom.

A preferable example of the modifying group is an —OH group. Another example is a metal atom of a compound semiconductor constituting a semiconductor nanoparticle, which binds to another atom through an oxygen atom. FIG. 1 is a pattern diagram showing the binding of an —OY group to the surface of the semiconductor nanoparticles comprising, for example, CdS. If the modifying group is the —OH group, the Cd atom on the surface of the semiconductor nanoparticles binds to the —OH group to form a Cd—O—H bond as shown in FIG. 2. Also, when the hydrolyzed silane coupling agent represented by the following general formula:

R—Si—(OH)$_3$.

is allowed to react with the semiconductor nanoparticles comprising CdS, a Cd—O—Si—R bond is formed on the surfaces of the particles. Further, ions such as a metal atom or a semimetal atom are added in an alkaline environment to form Cd—O-Z (wherein Z is selected from a metal atom or a semimetal atom). This enables the surface modification with various compounds typified by a thiol-containing compound. The formation of Cd(—O-Z)n (n=1, 2, 3, . . . ) can also attain a multi-layer of atoms that is the equivalent of an oxide film.

Formation of a layer coated with oxygen atoms on the surface of the semiconductor nanoparticle can stabilize the surface and can prepare semiconductor nanoparticles having fluorescence properties that significantly emit only band gap fluorescence.

Compound semiconductors that constitute the core of the semiconductor nanoparticles are represented by the following general formula:

MX wherein M is a metal atom and selected from Zn, Cd, Hg, In, Ga, Ti, W, Pb and the like; and X is selected from O, S, Se, Te, P, As, N, and the like.

Specific examples are ZnO, ZnS, ZnSe, ZnTe, CdO, CdS, CdSe, CdTe, HgS, HgSe, HgTe, InP, InAs, GaN, GaP, GaAs, TiO$_2$, WO$_3$, PbS, and PbSe.

The semiconductor nanoparticles of the present invention have significant fluorescence properties. In particular, the fluorescence properties are strongly exhibited when the semiconductor nanoparticles have a monodispersed distribution of particle sizes. More specifically, the particle sizes of the semiconductor nanoparticles are preferably monodispersed, so that deviations are less than 10% rms in diameter. Methods for monodispersing the particle sizes of the semiconductor nanoparticles are not limited, and examples thereof include conventional methods such as separation by electrophoresis, exclusion chromatography, size-selective precipitation, size-selective photoetching, and the reversed micelle method.

The fluorescence emitted by the semiconductor nanoparticles of the present invention has a sharp peak of fluorescence intensity. The semiconductor nanoparticles can also emit fluorescence in a narrow spectrum range of 60 nm or less in terms of the full width at half maximum (FWHM). It is preferably 40 nm or less, and more preferably 30 nm or less in terms of the full width at half maximum (FWHM).

The second aspect of the present invention relates to a method for producing the semiconductor nanoparticles wherein a compound having a hydroxyl group is allowed to react with the surfaces of the semiconductor nanoparticles for stabilization. Further, the semiconductor nanoparticles are placed in an alkaline environment to produce semiconductor nanoparticles comprising the —OH group bound to their surfaces. Furthermore, the semiconductor nanoparticles are allowed to react with various compounds in an alkaline environment to produce semiconductor nanoparticles wherein a metal atom on the particle surface of the compound semiconductor constituting the semiconductor nanoparticles binds to another atom through an oxygen atom.

The third aspect of the present invention relates to a fluorescence reagent that utilizes the fluorescence properties of the semiconductor nanoparticles. This fluorescence reagent can be used as a testing reagent in the fields of biotechnology or medicine. Also, it can be used as a light emitting element utilizing light emissions at various wavelengths. In addition, it can be applied to the fields where conventional fluorescence reagents are used.

PREFERRED EMBODIMENTS FOR CARRYING OUT THE INVENTION

Figure 1:
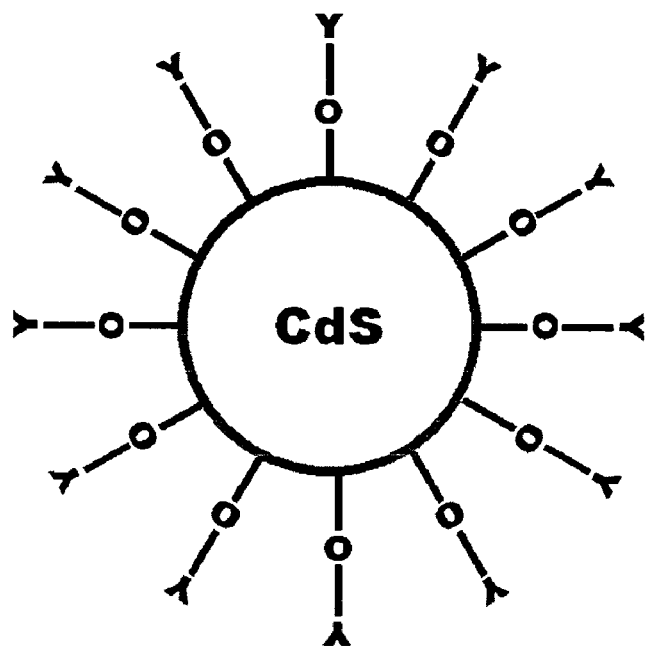
FIG. 1 is a pattern diagram showing the semiconductor nanoparticles according to the present invention.
Figure 2:
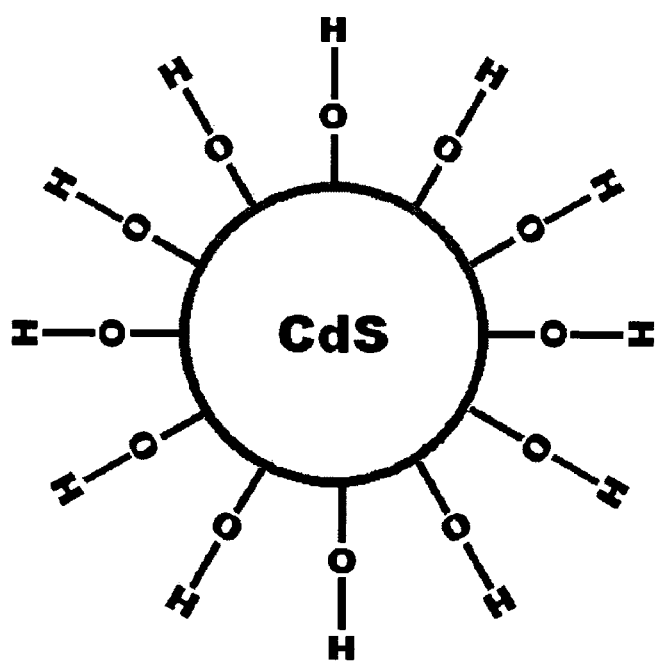
FIG. 2 is a pattern diagram showing the semiconductor nanoparticles according to the present invention.

It was mentioned above that the surface conditions of the semiconductor nanoparticles were considered to generate defective fluorescences in single-layered semiconductor nanoparticles. Based on this idea, the present inventors have continuously studied the influences of the surface conditions of the semiconductor nanoparticles.

In the above studies, the present inventors suspected the presence of impurities on the surfaces of the semiconductor nanoparticles to be a cause. Accordingly, they both purified semiconductor nanoparticles and attempted to eliminate impurities that were considered to exist on the surfaces of the semiconductor nanoparticles to as great an extent as possible. However, the prepared semiconductor nanoparticles and the modified semiconductor nanoparticles tend to coalesce very easily, and thus, purification thereof in a solution state was difficult. Further, the semiconductor nanoparticles obtained in this way did not exhibit sufficient fluorescence properties.

Given the above circumstances, the present inventors focused on the properties of the semiconductor nanoparticles, which were modified with a thiol compound, meaning that they emitted light in an alkaline solution. They then conducted studies on the behavior of the fluorescence emitted by the semiconductor nanoparticles in an alkaline aqueous solution. As a result, the semiconductor nanoparticles in an alkaline solution were confirmed to exist relatively stably in an aqueous solution without the operation of stabilization by a thiol compound or the like. It was confirmed that the fluorescence of these nanoparticles exhibited very narrow full widths at half maximum, and was sufficient in fluorescence intensity and in practicability.

Based on the aforementioned results, the present inventors have examined the method for producing these stable nanoparticles. A method for producing these nanoparticles is exemplified. A case where size-selective photoetching is adopted is exemplified herein, although any form may be adopted as long as semiconductor nanoparticles that have been modified and stabilized with oxygen-atom-coated surfaces are finally obtained.

In a semiconductor nanoparticle, the proportion of its surface area relative to its volume is very large. As a result, semiconductor nanoparticles tend to coalesce very easily. In order to allow the semiconductor nanoparticles to stably exist, measures have to be taken to prevent them from colliding or fusing with each other. A variety of measures have been devised so far, which can be roughly divided into two types. One is the physical isolation of the semiconductor nanoparticles by placing them in a solid matrix or a polymer matrix. The other is the inactivation of the particle surface by chemically modifying the metal-ion site on the particle surface with a low-molecule organic matter which is highly capable of forming a complex with the metal-ion site. Based on the latter measure, hexametaphosphoric acid is used as a stabilizer in this method.

At the outset, 1000 ml of aqueous solution comprising sodium hexametaphosphate (0.1 mmol) and cadmium perchlorate (0.2 mmol) was prepared and adjusted at a pH level of 10.3. Thereafter, the solution was subjected to bubbling using nitrogen gas, and hydrogen sulfide gas (0.2 mmol) was poured into the solution while vigorously stirring. Thereafter, stirring was carried out for a while. At this time, the color of the solution changed from optically transparent colorless to optically transparent yellow.

Figure 3:
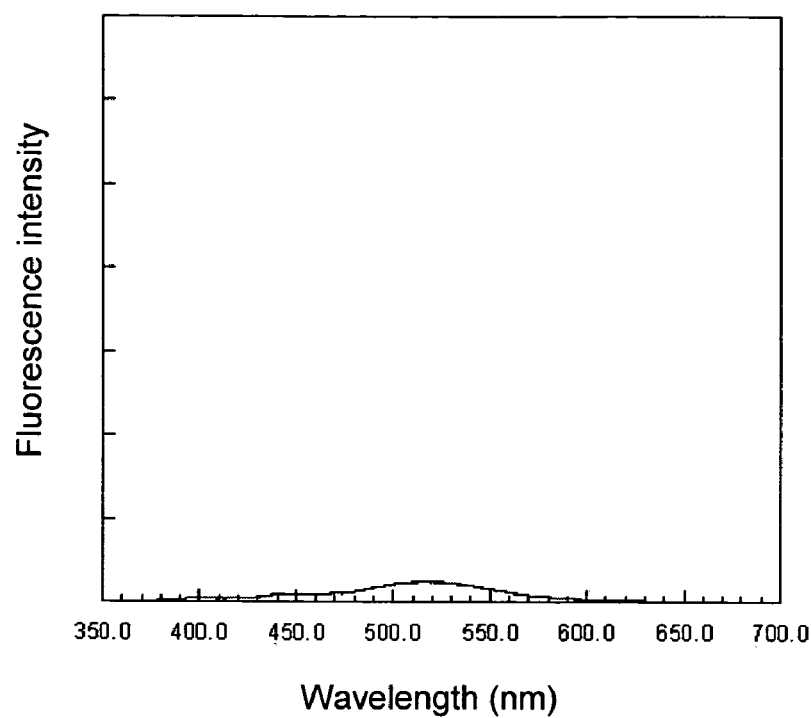
FIG. 3 shows a fluorescence emission spectrum of semiconductor nanoparticles stabilized with hexametaphosphoric acid before surface hydroxylation.

The semiconductor nanoparticles which have been already stabilized with hexametaphosphoric acid are already present in the solution. The semiconductor nanoparticles have a wide distribution of particle sizes, and the standard deviations reach up to 15% or more of the average particle sizes. As shown in FIG. 3, the fluorescence intensity of the semiconductor nanoparticles in this state is very weak as a whole.

Size-selective photoetching is described. Due to the quantum-size effect, the physicochemical properties of semiconductor nanoparticles depend on their particle sizes. Accordingly, the physical properties of these semiconductor nanoparticles in this state are averaged out and their traits cannot be fully manifested. Thus, there is a need to use chemical techniques to precisely separate and extract only the semiconductor nanoparticles of a specific particle size from semiconductor nanoparticles having a wide distribution of particle sizes immediately after preparation in order to attain monodispersed distributions. One example of the method according to the above is size-selective photoetching. Size-selective photoetching takes advantage of the fact that the energy gap of a semiconductor nanoparticle increases due to the quantum-size effect as the particle size thereof decreases and that a metal chalcogenide semiconductor is oxidatively dissolved in the presence of dissolved oxygen when irradiated with light. In this method, the semiconductor nanoparticles having a wide distribution of particle sizes are irradiated with monochromatic light of a wavelength shorter than the wavelength of the semiconductor nanoparticle's absorption edge. This causes only the semiconductor nanoparticles of larger particle sizes to be selectively photoexcited and dissolved, thus sorting the semiconductor nanoparticles into smaller particle sizes.

At the outset, the thus obtained solution of semiconductor nanoparticles having a wide distribution of particle sizes, which was stabilized by hexametaphosphoric acid, is subjected to bubbling with nitrogen gas, followed by further bubbling with oxygen for 10 minutes. Thereafter, methyl viologen is added to the solution at 50 $\mu$mol/l, and a laser was applied while stirring. The application of monochromatic light in the present invention is carried out for the purpose of photodissolution of the semiconductor nanoparticles. The wavelength of the monochromatic light was determined to be 450 nm. Variation of the wavelength of this monochromatic light can regulate the fluorescence wavelength at the peak in the fluorescence emission spectrum of the semiconductor nanoparticles.

When the semiconductor nanoparticles obtained by this method are irradiated with light having a wavelength of 476.5 nm, the average particle size is 3.2 nm and the standard deviation is 0.19 nm. Specifically, the standard deviation exhibits a very narrow distribution of particle sizes, i.e., approximately 6% of the average particle sizes. Thus, a solution of semiconductor nanoparticles with particle sizes very close to the monodispersed state can be obtained.

In this process, semiconductor nanoparticles in the solution are monodispersed and come to have a band gap fluorescence exhibiting a spectrum whose full width at half maximum is narrow depending on the monochromatic light irradiated and the particle sizes of the semiconductor nanoparticles. In contrast, the defective fluorescence that is considered to be caused mainly by the energy level on the surface of the semiconductor nanoparticles is developed at a relatively strong intensity compared with the intensity of the band gap fluorescence. Originally, such defective fluorescences become problematic as causes that inhibit the properties of the semiconductor nanoparticles. Thus, these defective fluorescences should be inhibited.

Figure 4:
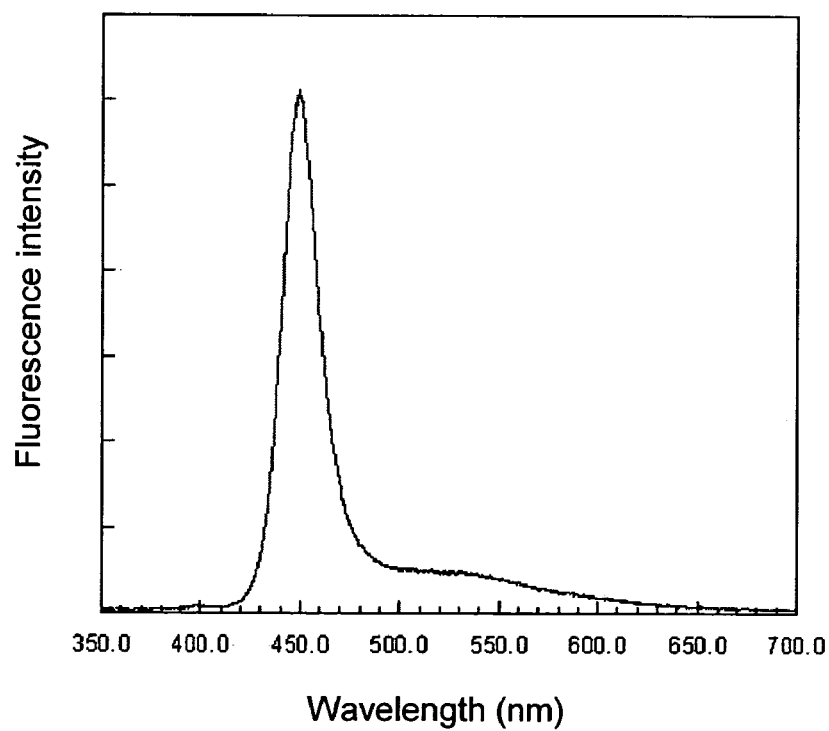
FIG. 4 shows a fluorescence emission spectrum of semiconductor nanoparticles stabilized by surface hydroxylation.

In order to further purify the thus obtained monodispersed semiconductor nanoparticles that were stabilized with hexametaphosphoric acid, 300 µl of mercaptopropionic acid (MPA) was added, and the mixture was stirred for several hours to perform surface modification. Further, ultrafiltration was performed to remove methyl viologen, hexametaphosphoric acid, unreacted thiol compound, ions dissolved at the time of photoetching, or the like in the aqueous solution. Thus, a pure solution of semiconductor nanoparticles that were stabilized with a thiol compound was obtained. Furthermore, an aqueous solution of 2.5-fold amount of 0.1 M NaOH aq. —HCl (pH 11) was added to the solution. This caused a thiol compound to be substituted with the OH ion, and semiconductor nanoparticles, the surfaces of which have been hydroxylated, were finally obtained as precipitates. Isolation was carried out by centrifuging the precipitate. The precipitates were easily dispersed in the aqueous solution. Further, the semiconductor nanoparticles existed stably in an aqueous solution and, as shown in FIG. 4, had a fluorescence emission spectrum with a narrow full width at half maximum and strong fluorescence intensity. Specifically, when only the nanoparticles, the surfaces of which have been coated with hydroxyl groups, are isolated, they exhibit excellent fluorescence properties. Accordingly, it was found that fluorescence properties resulting from the surfaces of semiconductor nanoparticles could be inhibited if a coating that is the equivalent of an oxide film was applied to the surfaces of the semiconductor nanoparticles.

As is apparent from the foregoing description, the defective site on the surface of the semiconductor can be inhibited by applying a coating that is the equivalent of an oxide film to the surfaces of the semiconductor nanoparticles. Also, semiconductor nanoparticles having sufficient fluorescence properties can be obtained. According to the method of the present invention, the semiconductor nanoparticles were coated by hydroxylating their surfaces. In principle, an equivalent effect can be attained by coating the semiconductor nanoparticles in such a manner that the surfaces thereof are surrounded by oxygen atoms. In a state where the oxygen atoms surround the semiconductor nanoparticles, a more significant effect can be expected when the atoms are multi-layered, as opposed to single-layered. Accordingly, the coating material in the present invention is not limited to the examples given herein. Also, the material for the core portion is not particularly limited. The same applies to nanoparticles comprising, for example, ZnS, ZnSe, ZnTe, CdS, CdSe, CdTe, HgS, HgSe, HgTe, InP, InAs, GaN, GaP, GaAs, PbS, or PbSe as a core material.

EFFECT OF THE INVENTION

Semiconductor nanoparticles having excellent fluorescence properties can be produced by an industrially suitable method, thereby providing a fluorescence reagent at low cost.

What is claimed is:

1. A method for producing semiconductor nanoparticles comprising:
   stabilizing a plurality of semiconductor nanoparticles in a solution;
   irradiating the semiconductor nanoparticles with light to photo-dissolve semiconductor nanoparticles with undesirable diameters therefrom thereby extracting semiconductor nanoparticles of a predetermined average size and a predetermined deviation;
   chemically modifying surfaces of the extracted semiconductor nanoparticles obtained from the irradiating step with a thiol compound thereby forming a complex; and
   reacting a compound having a hydroxyl group with the modified surfaces of the semiconductor nanoparticles thereby binding a group —OY to the modified surfaces of the semiconductor nanoparticles for stabilization, Y being selected from a hydrogen atom, a metal atom, a semimetal atom, an organic group, or an organic group that is intermediated by a metal atom or a semimetal atom.

2. The method for producing semiconductor nanoparticles according to claim 1, wherein the modified semiconductor nanoparticles are placed in an alkaline environment.

3. The method for producing semiconductor nanoparticles according to claim 1, wherein the modified semiconductor nanoparticles are allowed to react with an active hydrogen-containing compound in an alkaline environment.

4. The method for producing semiconductor nanoparticles according to claim 1, wherein the semiconductor nanoparticles are subjected to surface modification and purification.

5. The method for producing semiconductor nanoparticles according to claim 1, wherein the group —OY is an —OH group.

6. The method for producing semiconductor nanoparticles according to claim 1, wherein a material for cores of the semiconductor nanoparticles is selected from ZnO, ZnS, ZnSe, ZnTe, CdO, CdS, CdSe, CdTe, HgS, HgSe, HgTe, InP, InAs, GaN, GaP, GaAs, $TiO_2$, $WO_3$, PbS, and PbSe.

7. The method for producing semiconductor nanoparticles according to claim 1, wherein diameters of the semiconductor nanoparticles obtained from the irradiating step are monodispersed with deviations of less than 10% rms.

8. The method for producing semiconductor nanoparticles according to claim 1, wherein the modified semiconductor nanoparticles emit fluorescence in a narrow spectrum range of 60 nm or less in terms of the full width at half maximum (FWHM) upon applying excitation light.

9. The method for producing semiconductor nanoparticles according to claim 1, wherein diameters of the semiconductor nanoparticles obtained from the irradiating step are monodispersed with deviations of 6% rms.

10. The method for producing semiconductor nanoparticles according to claim 1, whereby the providing step, the plurality of semiconductor nanoparticles are stabilized with hexametaphosphoric acid in a solution.

11. The method for producing semiconductor nanoparticles according to claim 2, wherein the alkaline environment is between pH 9 and pH 11.

12. The method for producing semiconductor nanoparticles according to claim 4, wherein the number of the layers of atoms equivalent to an oxide film is at least one on the surfaces of the modified semiconductor nanoparticles.

13. The method for producing semiconductor nanoparticles according to claim 10, further comprising: purifying the semiconductor nanoparticles in the solution obtained after the irradiating step with mercaptopropionic acid.

14. The method for producing semiconductor nanoparticles according to claim 13, further comprising: ultrafiltrating the purified solution to remove methyl viologen, hexametaphosphoric acid, unreacted thiol compound, photo-dissolved irons therefrom.

* * * * *